United States Patent Office 3,663,408
Patented May 16, 1972

3,663,408

METHOD OF PRODUCING TANTALUM NITRIDE FILM RESISTORS

Shun Kumagai and Toshiaki Koikeda, Tokyo, Japan, assignors to Oki Electric Industry Company Limited, Tokyo, Japan Filed July 22, 1969, Ser. No. 843,603
Int. Cl. C23c *15/00*
U.S. Cl. 204—192 2 Claims

ABSTRACT OF THE DISCLOSURE

This invention is to conduct reactive sputtering by heating a substrate to a temperature of 300 to 550 ° C. while keeping the partial pressure of nitrogen at $3\times10^{-5}$ to $2\times10^{-4}$ torr in a high vacuum of less than $5\times10^{-3}$ torr of the mixed pressure of argon and nitrogen so that a tantalum nitride film resistor in which the temperature coefficient becomes zero in the plateau of characteristics may be obtained.

This invention relates to a method of producing tantalum nitride film resistors by reactive sputtering and more particularly to a method of producing those in which the variation (which shall be referred to as the temperature coefficient hereinafter) of the resistance value of the tantalum nitride with the temperature is made constant and zero over a wide temperature range.

A tantalum nitride film resistor is an excellent resistor in which the thermal instability and high temperature coefficient of metallic film resistors in the prior art have been overcome. Particularly it has such characteristics far superior to those of conventional resistors that the variation of the resistance value with the lapse of years can be prevented by the formation of an oxide film by the anodization of the surface and the heat-treatment in air, that such special treatment for protection as molding or sealing need not be applied due to the presence of said oxide film and that the temperature coefficient is —70 to —100 p.p.m./° C. However, with the recent development of the electronic technique, particularly a resistor of such temperature coefficient as about —70 to —100 p.p.m./° C. is not satisfactory and further it has been impossible to make a resistor low in the temperature coefficient.

An object of the present invention is to provide a method of producing a tantalum nitride film resistor in which the temperature coefficient in the plateau is controlled to be zero or freely determined and is high in reproductivity.

Figure 1:
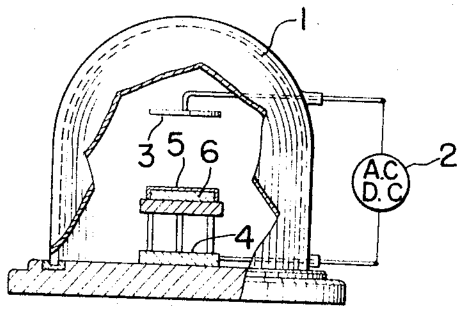
FIG. 1 PRIOR ART
FIG. 1 is a front elevational view, partly in section, of an apparatus for producing films of tantalum nitride by conventional reactive sputtering.

A conventional method of producing tantalum nitride film resistors shall be explained with reference to the accompanying drawings. Sputtering used to be made by glow-discharging by using the sputtering apparatus shown in FIG. 1. In FIG. 1 when nitrogen gas of a partial pressure of $5\times10^{-5}$ to $10^{-3}$ torr is mixed into argon to keep the mixed pressure at about $10^{-2}$ torr in a vacuum chamber 1 and a high voltage is impressed between a cathode 3 and anode 4 formed of tantalum by a current source 2 to cause a glow-discharge, the ionized gas molecules will collide with the cathode 3 so severely that tantalum will be discharged and therefore tantalum nitride will be deposited on the substrate 6 according to the pattern of a mask 5. Finally the substrate is heated in air so that the tantalum nitride film may be stabilized to be a resistor in the conventional producing method.

Figure 2:
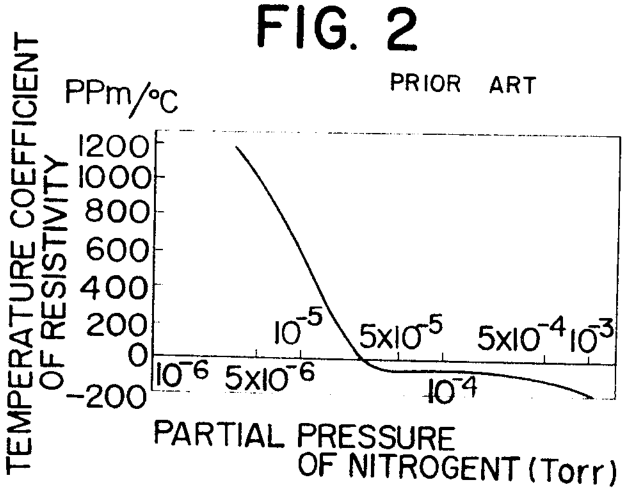
FIG. 2 PRIOR ART
FIG. 2 is a characteristic graph of a film of tantalum nitride by a conventional producing method.

In the characteristics of the tantalum nitride film resistor produced by such producing method, as shown in FIG. 2, the temperature coefficient will be zero when the partial pressure of nitrogen is about $3\times10^{-5}$ torr but the critical conditions are so strict that, in fact, the production is impossible and the produced film is mostly of a structure close to that of a metallic tantalum film and is low in the stability. Therefore, the temperature coefficient will be about —100 p.p.m./° C. in the plateau in which the characteristics are stable. No characteristic better than that can be obtained and at the same time the temperaure coefficient can not be controlled to be of any value. This fact is made definite in the article of Berry, Gerstenbery and McLean of Bell Laboratory, U.S.A. An improved producing method has been strongly hoped for.

The method according to the present invention is to eliminate the above mentioned defects. An apparatus for working the method of the present invention shall be explained with reference to FIG. 3.

Figure 3:
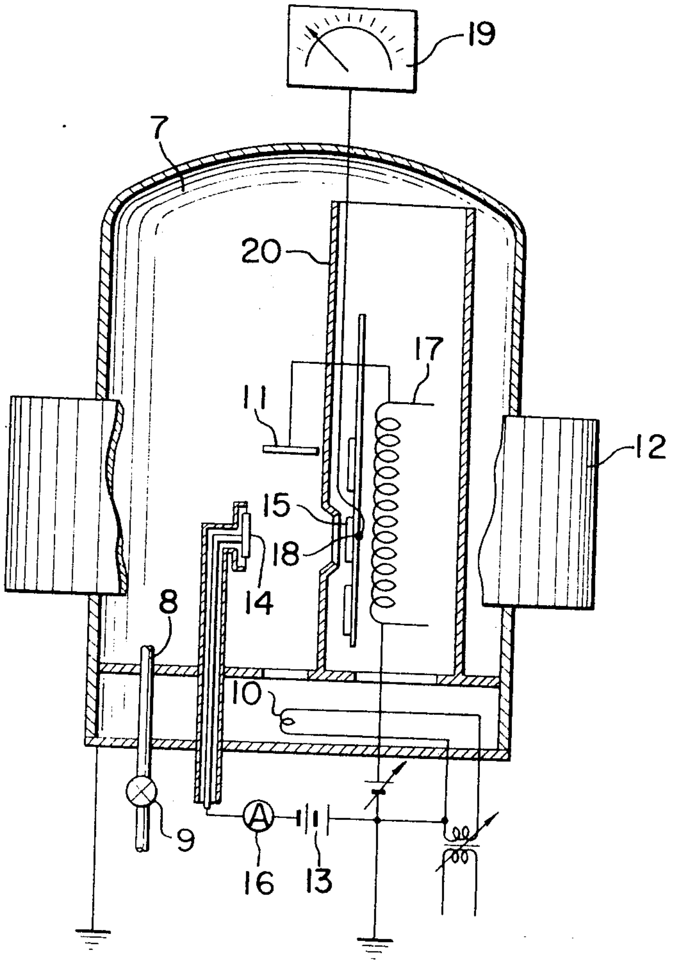
FIG. 3 is a sectional view of a plasma sputtering apparatus for producing films of tantalum nitride by reactive sputtering to be used in working the method of the present invention.

FIG. 3 shows a plasma-sputtering apparatus used in the present invention and shows the interior of a vacuum chamber in which reactive sputtering takes place and the electric system of the apparatus. The present apparatus is evacuated to $4\times10^{-6}$ torr from the atmosphere in about 30 minutes by means of a rotary pump and oil diffusing pump. Determined nitrogen gas and argon gas are admitted into a vacuum chamber 7 as a mixed gas through a gas introducing system 8. The mixed gas pressure is regulated to be about $2.4\times10^{-3}$ torr by means of a needle valve 9. Thermoelectrons are discharged toward an anode 11 from a filament 10 so as to collide with the gas to ionize it during this step. The ionized plasma is concentrated by a magnetic field generated by a coil 12. When a high voltage current source 13 is grounded on the positive (+) side and is connceted to a tantalum target 14 on the negative (—) side to apply a voltage, the positive ions in the plasma will be accelerated toward the tantalum target 14 and will collide with the target, sputtering will take place and the target will react with nitrogen which is an active gas so that tantalum nitride may be deposited on a substrate 15 heated to about 300 to 550° C. In such case, the sputtering current is measured with an ammeter 16, the substrate 15 is heated with a heater 17 and the temperature of the substrate 15 is measured with a voltmeter 19 by setting a thermocouple 18 on the back surface of the substrate. As the fine fluctuation of the plasma enters the thermocouple 18 as an induced electromotive force, it is necessary to perfectly shield the thermocouple 18 with a shield 20.

The substrate used in the present invention is a plate of a size of 25 x 50 mm. of glazed ceramics, ordinary glass or Corning No. 7059 glass. It is boiled in pure water containing a small amount of a neutral detergent, is supersonically washed in trichlorethylene and then in acetone and is then dried to be used as confirmed to have no impurity deposited on the surface.

Figure 4:
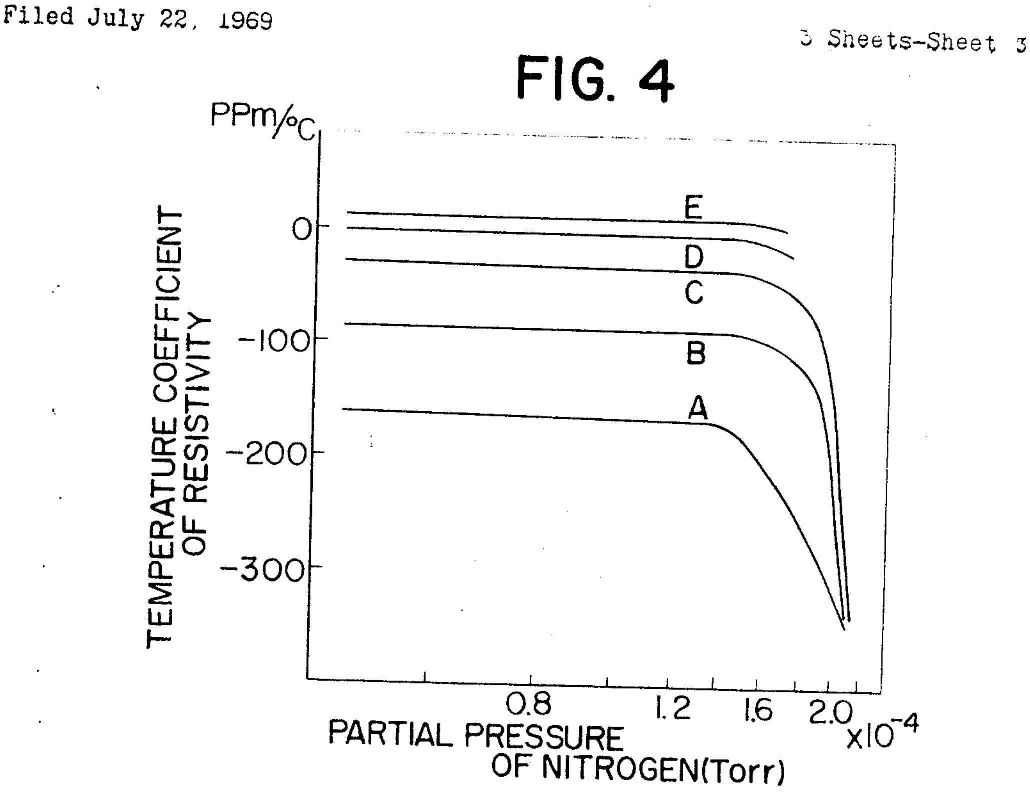
FIGS. 4 and 5 are characteristic graphs of tantalum nitride film resistors by the producing method according to the present invention.

FIG. 4 shows characteristics of a resistor by the method of the present invention. The temperature coefficient of the resistivity in case the substrate temperature was varied was measured over the range of the partial pressure of nitrogen gas in which the specific resistance and the temperature coefficient of the resistivity showed a uniform plateau. According to the graph, it is found that, with the rise of the substrate temperature (the characteristic curve A at 150° C., characteristic curve B at 200° C., characteristic curve C at 300° C., characteristic curve D at 400° C. and characteristic curve E at 480° C.), the temperature coefficient of resistivity approaches zero and realizes zero at 400° C. The fact that the temperature coefficient of resistiivty becomes zero over the wide range of the partial pressure of nitrogen is important to the reproductivity of the characteristics of the product. The specific resistance of this tantalum nitride film is 250 to 260μ Ω cm. at 400° C. and is not substantially different from the specific resistance value of the tantalum nitride film in the conventional report. Further, in the observation with X-ray diffractions, under a partial pressure of $0.8 \times 10^{-4}$ torr of nitrogen gas during the sputtering, the substrate temperature is 200, 270, 330, 370, 420 and 480° C., all consisting mostly of hexagonal crystal forms. Thus, it can be said that, even when the substrate is at a high temperature, according to the producing method of the present invention, the film will be mostly of a hexagonal crystal form.

Figure 5:
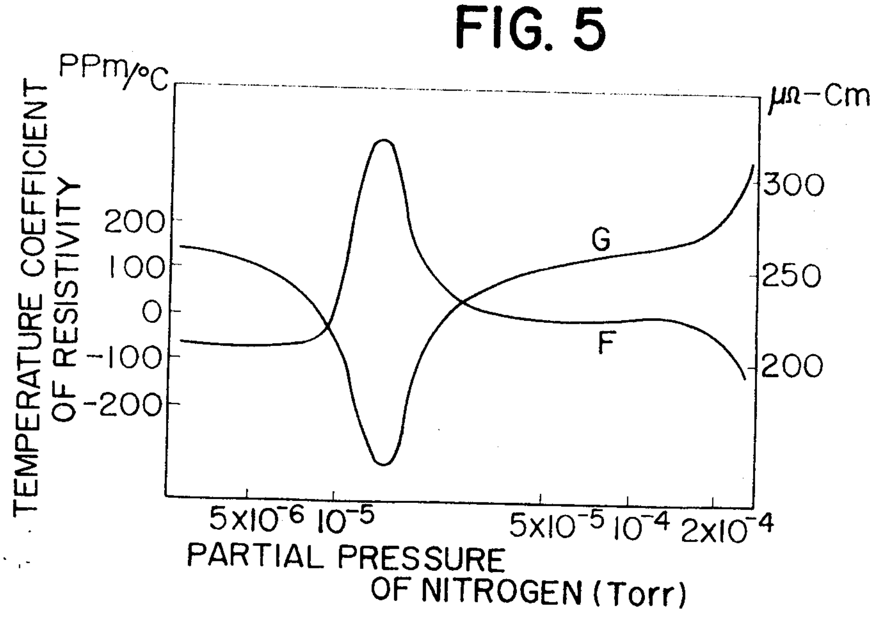

Now, in FIG. 4 and FIG. 5, the characteristics of the temperature coefficient and specific resistance for the partial pressure of nitrogen gas when the mixed pressure of argon and nitrogen gas was kept at $1.6 \times 10^{-3}$ torr at a substrate temperature of 400° C. are shown respectively by the characteristic curves F and G. According to these characteristic graphs, the tantalum nitride film of a low temperature coefficient is obtained in a range of the partial pressure of about $3 \times 10^{-5}$ to $2 \times 10^{-4}$ torr of nitrogen gas and in the range of about $5 \times 10^{-5}$ to $1.6 \times 10^{-4}$ torr a plateau in which the temperature coefficient is zero is formed.

Further, as other conditions for producing tantalum nitride film resistors there are such sputtering curent as is shown in Example 1, such sputtering voltage as is shown in Example 2 and such heating in air after sputtering as is shown in Example 3. But the influences of any of them on the temperature coefficient and specific resistance of the tantalum nitride film resistor are not so high as of the substrate temperature, the mixed pressure of argon and nitrogen gas and the partial pressure of nitrogen gas.

EXAMPLE 1

In case the substrate temperature was 300° C., the sputtering voltage was −1000 v., the mixed gas pressure in the vacuum chamber was $1.6 \times 10^{-3}$ torr and the partial pressure of nitrogen gas was $1.3 \times 10^{-4}$ torr, when the sputtering current was made 100 to 200 ma., the temperature coefficient of resistivity was —60 p.p.m./° C. in case the current was small, was —30 p.p.m./° C. at an intermediate current of 150 ma. and was so small as to be —25 to —20 p.p.m./° C. at the maximum current value of 200 ma. of the stable sputtering of the present apparatus but was substantially satuarted. Under the same conditions, at 350° C., it was saturated with the increase of sputtering but it was —20 p.p.m./° C. at 150 ma., was —15 to —10 p.p.m./° C. at 200 ma. and thus approached zero. However, when the substrate temperature was 400° C., in the stable sputtering current range, almost all the temperature cofficients of resistivity were zero and some showed positive values. On the other hand, at 480° C., many showed positive values and, when the sputtering current was smaller, the temperature coefficient of resistivity was zero.

EXAMPLE 2

The relation between the temperature coefficient of resistivity and the sputtering voltage applied to the tantalum target was measured. When the substrate temperature was 300° C., the sputtering current was 160 ma., the mixed gas pressure in the vacuum chamber was $1.6 \times 10^{-3}$ torr and the partial pressure of nitrogen gas was $0.8 \times 10^{-4}$ torr, the temperature coefficient of resistivity was —200 p.p.m./° C. when the sputtering voltage applied to the tantalum targent was —400 v., was —70 p.p.m./° C. at 500 v., was —30 p.p.m./° C. at —600 to —2000 v. and was thus saturated. When the substrate temperature was 400° C., in a range of —600 to —2000 v. and of a sputtering current of 150 to 200 ma., the temperature coefficient of resistivity was also zero.

EXAMPLE 3

Three groups of temperature coefficients of resistivity of —90±10, —40±10 and 0±10 p.p.m./° C. produced with a plasma-sputtering apparatus using the present invention were tested by being left in air at high temperatures of 297 and 227° C. and the stabilities of the resistivity were compared.

The results are shown in Table 1.

TABLE 1

| Testing temperature (in ° C.) | 297 | | 227 | |
|---|---|---|---|---|
| Testing time (in hours) | 140 | 500 | 140 | 500 |
| Temperature coefficient of resistivity/variation rate (in percent) of resistivity: | | | | |
| —90 p.p.m./° C | 8 | 13 | 0.6 | 2.0 |
| —40 p.p.m./° C | 6 | 11 | 0.3 | 1.5 |
| 0 p.p.m./° C | 5 | 11 | 0.4 | 1.6 |

According to this table, in the range of the temperature coefficients of resistivity, substantially no difference is seen. It is thus found that the excellent stability of the tantalum nitride film was not impaired by making the temperature coefficient of resistivity zero. In this experiment, a tantalum nitride resistance pattern as subjected to an anodization and a heat-treatment in air at 300° C. for 5 hours was made an initial value.

As explained above, according to the conventional producing method, the atmosphere consists of argon and nitrogen, the mixed pressure is $10^{-2}$ torr, sputtering is conducted by a glow-discharge which is a characteristic of bipolar sputtering, therefore it is necessary to impress a high voltage of 3 to 5 kv. and the characteristic of the formed tantalum nitride film resistor has been such as always has a temperature coefficient of about −100 p.p.m./° C. in the plateau.

On the other hand, according to the producing method of the present invention, it is the same that the atmosphere is formed of argon and nitrogen but the mixed pressure is about $2.4 \times 10^{-3}$ to $6 \times 10^{-4}$ torr which has never been glow-discharged, $5 \times 10^{-6}$ to $10^{-3}$ torr and is in a wide range of the mixing ratio of about a plasma by the ionization of the gas by thermoelectrons is formed, therefore it is possible to conduct sputtering with such low sputtering voltage of 600 to 1000 volts and not only a tantalum nitride film resistor having a plateau of a temperature coefficient of zero can be easily produced by setting the substrate temperature in a range of about 300 to 550° C. but also, as required, the temperature coefficient can be easily set at −10, —20 or —40 p.p.m./° C. or the like, by properly controlling such parameters as the substrate temperature, gas pressure, sputtering current and voltage. The producing method according to the present invention has such excellent effects.

What is claimed is:

1. A method of producing resistors by the deposition of a tantalum nitride film upon a substrate by the steps comprising creating within a high vacuum mixed atmosphere of argon and nitrogen of less than $5 \times 10^{-3}$ torr, in which the partial pressure of nitrogen is in the range of about $3 \times 10^{-5}$ to $2 \times 10^{-4}$ torr, an ionized plasma by emission from a thermionic cathode toward an anode, said plasma existing between said substrate and a tantalum target having a surface extending generally parallel to a line passing between said thermionic cathode and the anode therefor, concentrating said plasma by a surrounding magnetic field, connecting said target to a high voltage source to subject the target to reactive sputtering, and depositing the sputtered reaction product on said substrate maintained at a temperature of about 300–550° C.

2. The method of claim 1 wherein a voltage of about 0.6–2 kv. is applied to said tantalum target during said reactive sputtering and said voltage and said substrate temperature are sufficient to produce on said substrate a film of tantalum nitride having a temperature coefficient of substantially zero.

References Cited

UNITED STATES PATENTS 3,242,006 3/1966 Gersenberg ---------- 204—192

JOHN H. MACK, Primary Examiner

S. S. KANTER, Assistant Examiner